Patented Dec. 8, 1925.

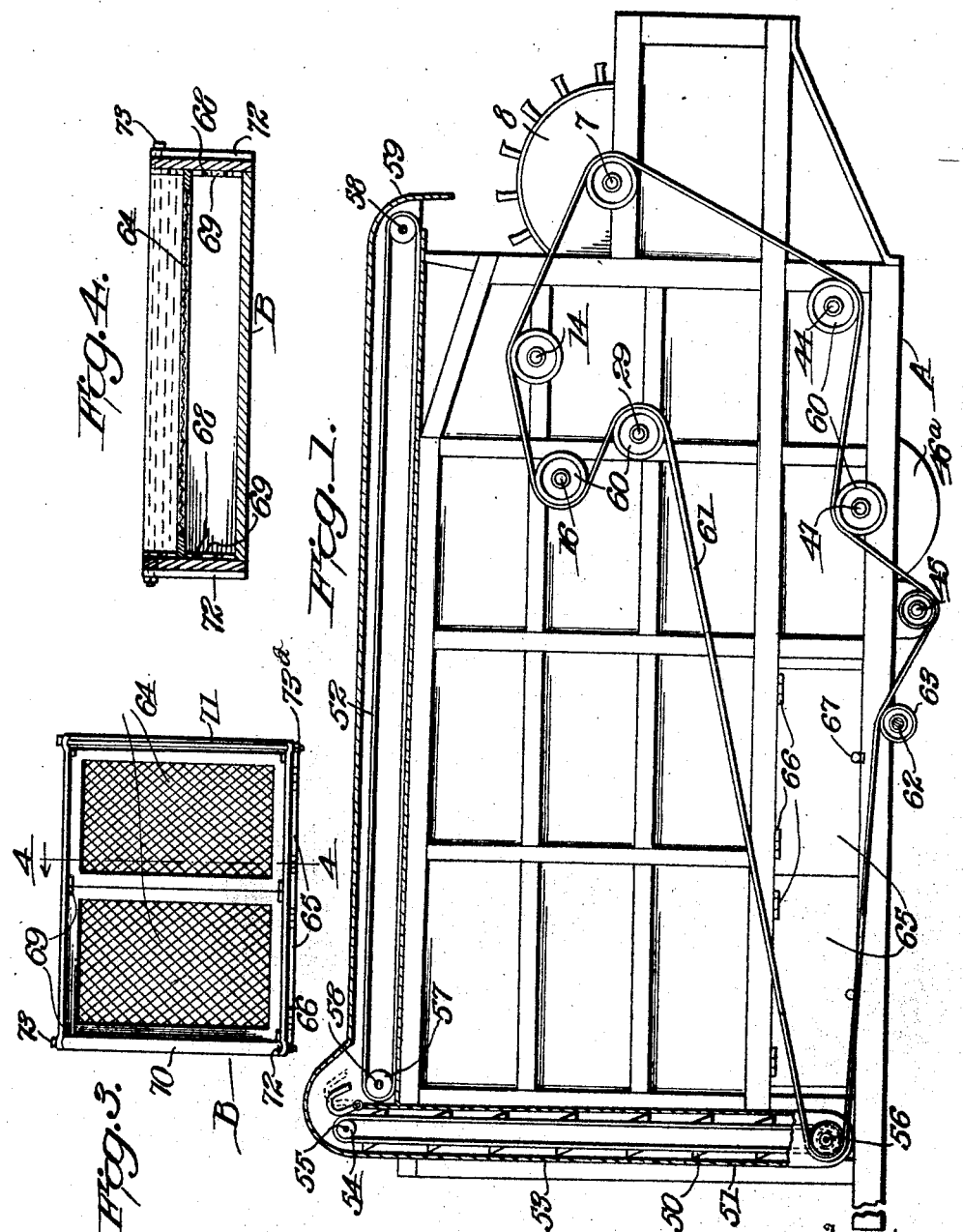

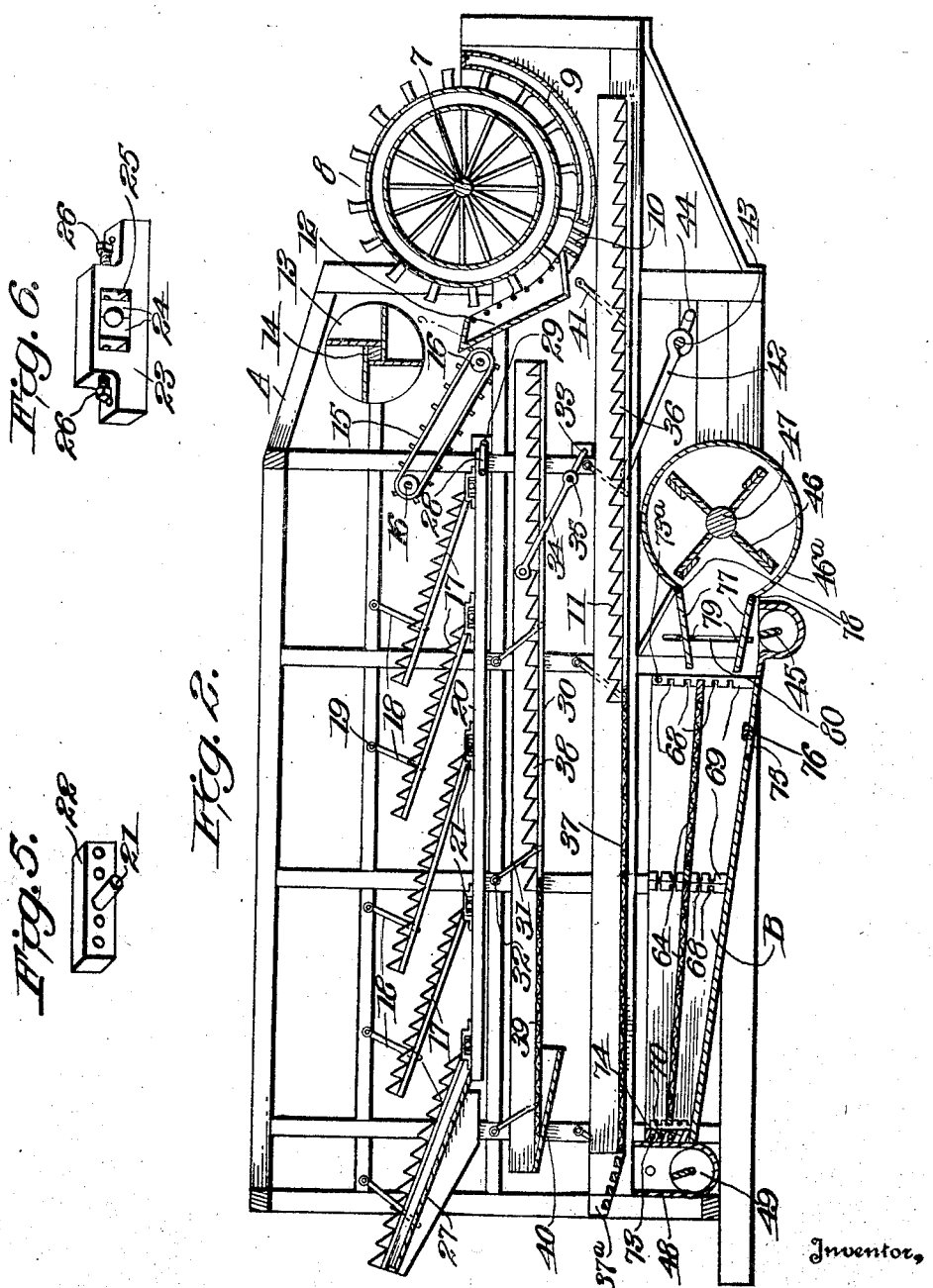

1,565,078

UNITED STATES PATENT OFFICE.

JESSE L. FITZGERALD, SR., OF OBERLIN, KANSAS.

THRASHING MACHINE.

Application filed March 20, 1922. Serial No. 545,147.

*To all whom it may concern:*

Be it known that JESSE L. FITZGERALD, Sr., a citizen of the United States, residing at Oberlin, in the county of Decatur and State of Kansas, has invented certain new and useful Improvements in Thrashing Machines, of which the following is a specification.

This invention relates to a thrashing machine.

The principal object is to provide a means whereby that portion of the grain which is lost according to known methods and mechanism of thrashing may be saved.

Another important object is to provide a thrashing machine having a plurality of grain pans or receptacles and a plurality of sets of riddles cooperating to attain the ends stated.

A further object is to provide a novel construction of grain shoe.

Additional and specific objects and advantages will appear from a consideration of the description following taken in connection with the accompanying drawings, illustrating one practical embodiment of the invention and wherein:—

Figure 1 is a view of a thrasher constructed in accordance with my invention, being principally in side elevation, but partly in section;

Figure 2 is a vertical longitudinal sectional view of the machine;

Figure 3 is a plan view of an improved grain shoe which may be used;

Figure 4 is a cross sectional view on line 4—4 of Figure 3 and

Figures 5 and 6 are detail perspective views of pivotal mounting devices employed in connection with the racks.

Like reference characters designate like or corresponding parts throughout the views.

In reducing the invention to practice, I employ a suitable framework A transversely of which a shaft 7 is journaled to which is keyed a suitable thrashing cylinder 8 in cooperative relation with an adjustable concave 9 at the rear of which a heavy grating 10 is provided for escape onto a main pan 11. A grating structure is also provided at 12 above the grating 10. The grate 12 is carried by a casing or frame which is closed at the top and back and extends the full width of the cylinder between the cylinder and the straw racks. An ordinary beater 13 is secured to a shaft 14 journaled transversely of the frame A and disposed over a slatted riddle 15 in the form of an endless canvas or belt trained over pulleys 16.

In the rear of the riddle 15 a plurality of straw racks of usual construction are provided at 17. The upper ends of said straw racks 17 may be suspended by links 18 pivoted thereto and to horizontal bars of the frame A as at 19. The lower ends of the racks 17 are pivotally connected to a bar 20 as at 21. To effect the pivotal connection at 21, the parts illustrated in Figures 5 and 6 may be used. A block 22, shown in Figure 5, may be attached to the racks, and bearings as shown in Figure 6 may be attached to bar 20. Such bearings include a frame 23 having slidable journal blocks 24 therein in which the pivot 21, which extends from block 22, is disposed. Blocks 24 are positioned in a relatively large recess 25 and their position is governed by the adjustment of bolts 26.

The rearmost rack 17 has a solid pan 27 beneath the same to prevent loss of grain at the rear end of the machine and guide it to the grain pans. Bar 20 may be reciprocated in any suitable manner, as from a crank connection 28 with a shaft 29.

Disposed directly below the racks 17 is an auxiliary grain pan 30 which may be suspended by links 31 pivoted to the frame at 32 and to the pan. The pan 30 may be reciprocated in any suitable manner as from a shaft 33 having a link 34 pivoted to a crank 35 thereof and to the pan. It will be noticed that the main grain pan is disposed directly below the auxiliary grain pan 30.

The main grain pan has a rack structure 36 at the front thereof and a chaffer or sieve 37 in the rear thereof. The auxiliary grain pan 30 has rack means 38 which projects farther to the rear than the rack means 36 and it has a chaffer or sieve 39 in the rear thereof. To prevent escape of grain from the sieve 39, beyond the chaffer 37, a downwardly inclined shield or plate is provided at 40. The forward portion of each pan has an imperforate bottom upon which the racks extend longitudinally, and it will be noted that the front end of the lower main pan 11 projects under the grate 10, while the upper auxiliary pan terminates short of the grate structure 12 and is disposed in a plane above the lower end of said structure.

The main grain pan may be driven in any suitable manner. It is suspended by links 41 pivoted thereto and to the frame while a link 42 is pivoted thereto and also to a crank 43 on a rotatable shaft 44.

A grain shoe is provided at B in front of which an auger 45 is provided for conveyance of the grain to the destination desired. A fan is provided at 46 in a casing 46ª driven by a shaft 47 journaled to the frame A. At 48 a receptacle is provided to receive tailings and a return auger or conveyor 49 is mounted therein. An extension 37ª is provided at the rear end of the chaffer 37 and secured in any convenient or preferred manner. If it be hinged, it may be set in various angular positions which may sometimes be desirable and the extension or inclined shield or plate 40 may be mounted in the same manner. The extension 37ª has an open bottom and may have slats extending across the same so that the tailings will be directed into the auger 49, but the extension 40 has an imperforate bottom to direct grain onto the chaffer 37, as will be understood readily upon reference to the drawings.

The conveyor 49 moves the tailings to a position where they are engaged by the buckets 50 of an elevator 51 whereby they are delivered onto a conveyor 52 which discharges them onto the thrashing cylinder 8. A suitable casing 53 encloses conveyors 51 and 52. Conveyor 51 is endless and trained over pulleys 54 mounted on shafts 55 and 56. Likewise conveyor 52 is endless and is trained over suitable pulleys 57, one of which is driven, and which pulleys are mounted on shafts 58. A guiding and deflecting plate 59 for the tailings is provided at the forward extremity of the casing 53.

The various shafts referred to may be rotated or driven in any desired manner, usually, as shown in Figure 1, by pulleys 60 keyed thereto and a belt 61 trained thereover. Belt 61 may be driven from any suitable source of power through a shaft 62 and a drive pulley 63 in contact with the belt.

Shoe B has a plurality of removable sieves 64 therein which are insertable and removable through doorways normally closed by doors 65 hinged to the frame A at 66 and having suitable fastenings at 67. Sieves 64 may be adjusted vertically and to this end are removably insertable in selective openings or recesses 68 of brackets at 69. End or tail board 70 is disposed in channels or grooves 72 at the rear ends of the sides of the shoe and adjustably secured therein by a removable bolt 73 passing through selected openings 74 therein. At the forward end, a removable bolt 73ª connects the sides of the shoe.

In order that weed seed, which are smaller than the grain thrashed, may escape from the shoe, a suitable opening 75 is provided in the bottom wall of the shoe and adapted to be closed by a door 76, when desired.

The blasts from fan 46 are properly directed into the shoe B by plates 77 hinged at 78 to casing 46ª and secured in adjusted positions by suitable means at 79 passing through a slot 80 in said casing.

In operation, the cylinder 8 is rotated and the thrashing mechanism associated therewith operates in the usual manner with approximately 85 or 90 per cent of the grain passing through the grating 10 onto the lower pan 11, gradually moving rearwardly and falling through the front portion of the chaffer 37 onto and through the forward sieve 64 and thence to the conveyor 45. The straw passes over the riddle 15 and racks 17 and in practice it contains from 10 to 15 per cent of grain which has not been thrashed. As such straw passes over the racks 17 the grain therein is dislodged therefrom falling onto the racks 38, moving gradually rearwardly onto chaffer 39, falling therethrough, through chaffer 37 at the rear and thence through the rear sieve 64 onto the bottom wall of the shoe and then to the conveyor 45. To attain the ends stated, that is to separate the 10 or 15 per cent of grain mentioned, a plurality of grain pans are necessary since in the case of a single grain pan, the chaff constantly falls from the straw racks onto said single grain pan mixing with the wheat or grain thereon which is at first free of chaff as it leaves the cylinder, but since it is mixed with a bed of chaff, usually to a depth of four or more inches in practice, it comprises about 35 per cent wheat or grain and 65 per cent chaff. This avoids effective separation and cleaning.

Attention is called to the fact that the sieves 64 are readily removable for cleaning through the frame of doors 65.

Instead of grain pans and straw racks having a mere vibratory motion as usual, their movement or vibration is imparted through rotation or movement of the different cranks described.

Merely one practical embodiment has been illustrated and described, in view of which fact, changes within the spirit and scope of the invention as defined by the appended claim may be resorted to.

I claim:—

In a thrashing machine, a frame, a thrashing mechanism in said frame, means for moving straw rearwardly through the frame from said thrashing mechanism, an auxiliary grain pan disposed beneath the straw-moving means and having an imperforate forward portion provided with means for moving chaff rearwardly and a perforated screen forming rear portion, a main grain pan disposed beneath said auxiliary pan and extending forwardly beyond the forward end of the auxiliary pan to a point beneath said thrashing mechanism, said main pan having a perforated screen forming rear portion disposed beneath the screen forming portion of the auxiliary pan and extending forwardly to a point intermediate the ends of the imperforate forward portion of the auxiliary pan and an imperforate forward portion provided with means for moving chaff rearwardly, and a shoe disposed beneath the main pan and including a screening medium disposed beneath the screen forming rear portion of the main pan.

In testimony whereof I affix my signature.

JESSE L. FITZGERALD, Sr.